United States Patent
Wu et al.

(10) Patent No.: US 8,201,246 B1
(45) Date of Patent: Jun. 12, 2012

(54) PREVENTING MALICIOUS CODES FROM PERFORMING MALICIOUS ACTIONS IN A COMPUTER SYSTEM

(75) Inventors: Handong Wu, Los Angeles, CA (US); Raimund Alexander Genes, Jetzendorf (DE)

(73) Assignee: Trend Micro Incorporated, Tokyo (JP)

( * ) Notice: Subject to any disclaimer, the term of this patent is extended or adjusted under 35 U.S.C. 154(b) by 1144 days.

(21) Appl. No.: 12/072,292

(22) Filed: Feb. 25, 2008

(51) Int. Cl.
  *G06F 11/00* (2006.01)
  *G06F 7/04* (2006.01)
  *G06F 12/14* (2006.01)
  G06F 15/16 (2006.01)
  G06F 9/46 (2006.01)
  G06F 21/00 (2006.01)

(52) U.S. Cl. ............ 726/22; 726/23; 726/24; 726/25; 726/26; 703/23

(58) Field of Classification Search .......... 726/22, 726/23, 24, 25, 26; 713/200; 703/23
See application file for complete search history.

(56) References Cited

U.S. PATENT DOCUMENTS

| | | | |
|---|---|---|---|
| 6,091,412 A | 7/2000 | Simonoff et al. | |
| 6,356,931 B2 | 3/2002 | Ismael et al. | |
| 6,401,134 B1 | 6/2002 | Razavi et al. | |
| 6,433,794 B1 | 8/2002 | Beadle et al. | |
| 6,492,995 B1 | 12/2002 | Atkin et al. | |
| 6,647,544 B1 | 11/2003 | Ryman et al. | |
| 6,757,895 B1 | 6/2004 | Beadle et al. | |
| 6,799,195 B1 | 9/2004 | Thibault et al. | |
| 6,842,777 B1 | 1/2005 | Tuli | |
| 6,842,897 B1 | 1/2005 | Beadle et al. | |
| 6,941,552 B1 | 9/2005 | Beadle et al. | |
| 6,976,059 B1 | 12/2005 | Rogalski et al. | |
| 7,039,691 B1 | 5/2006 | Turnidge | |
| 7,191,211 B2 | 3/2007 | Tuli | |
| 7,664,626 B1 * | 2/2010 | Ferrie | 703/23 |
| 2001/0054062 A1 | 12/2001 | Ismael et al. | |
| 2002/0103882 A1 | 8/2002 | Johnston et al. | |
| 2002/0129281 A1 | 9/2002 | Hatfalvi et al. | |

(Continued)

FOREIGN PATENT DOCUMENTS

WO  WO 2007076624 A1 *  7/2007

OTHER PUBLICATIONS

Bakshi, A.; Yogesh, B.; "Securing Cloud from DDOS Attacks Using Intrusion Detection System in Virtual Machine"; Communication Software and Networks, 2010. ICCSN '10. Second International Conference on Digital Object Identifier: 10.1109/ICCSN.2010.56; Publication Year: Apr. 2010 , pp. 260-264.*

(Continued)

*Primary Examiner* — Eleni Shiferaw
*Assistant Examiner* — Courtney Fields
(74) *Attorney, Agent, or Firm* — Okamoto & Benedicto LLP

(57) ABSTRACT

Malicious codes may be prevented from performing malicious actions in a computer that does not have a virtual machine by simulating presence of the virtual machine. When a computer program performs an action in the computer, the action may be intercepted to determine if the computer program is malicious code probing the computer for presence of the virtual machine. A response to the action may be in accordance with convention of the virtual machine when the action is deemed to be for purposes of detecting the virtual machine. Otherwise, the action may be allowed to proceed.

14 Claims, 2 Drawing Sheets

U.S. PATENT DOCUMENTS

| | | |
|---|---|---|
| 2003/0041106 A1 | 2/2003 | Tuli |
| 2003/0212902 A1* | 11/2003 | van der Made .............. 713/200 |
| 2004/0015966 A1 | 1/2004 | MacChiano et al. |
| 2004/0148608 A1 | 7/2004 | Gendreau et al. |
| 2004/0158830 A1 | 8/2004 | Chung et al. |
| 2004/0230643 A1 | 11/2004 | Thibault et al. |
| 2004/0267866 A1 | 12/2004 | Carollo et al. |
| 2005/0188361 A1 | 8/2005 | Cai et al. |
| 2005/0246176 A1 | 11/2005 | Creamer et al. |
| 2005/0289540 A1 | 12/2005 | Nguyen et al. |
| 2006/0010314 A1 | 1/2006 | Xu |
| 2006/0112342 A1 | 5/2006 | Bantz et al. |
| 2006/0191010 A1 | 8/2006 | Benjamin |
| 2007/0067433 A1 | 3/2007 | D'Alterio et al. |
| 2007/0159974 A1 | 7/2007 | Fabbri et al. |
| 2008/0222729 A1* | 9/2008 | Chen et al. ..................... 726/24 |

OTHER PUBLICATIONS

"U3 Bring the Power of Portable Software to Your USB Flash Drive—Make It a Smart Drive!", 2 sheets, 2005-2006, webpage [online][retrieved on Mar. 26, 2007]. Retrieved from the internet:<http://www.u3.com/>.

Creating Signed Remote Applications—Creating Applications with Mozilla, pp. 1-4, Chapter 12. Remote Applications, [retrieved on Mar. 26, 2007], Retrieved from the internet:<http://www.csie.ntu.edu.tw/~piap/docs/CreatMozApp/mozilla-chp-12-sect-6.html>.

VMware, from Wikipedia, the free encyclopedia, pp. 1-8, [retrieved on Mar. 26, 2007]. Retrieved from the internet: <http://en.wikipedia.org/wiki/VMware>.

VMware, White Papers—Virtualization Overview. 12 sheets, 2007. [online] [retrieved on Mar. 26, 2007]. Retrieved from the internet: <http://www.vmware.com/solutions/whitepapers.html>.

VMware, White Papers—Virtualization: Architectural Considerations and Other Evaluation Criteria. 15 sheets, 2007 [online][retrieved on Mar. 26, 2007]. Retrieved from the internet: <http://www.vmware.com/solutions/whitepapers.html>.

* cited by examiner

PREVENTING MALICIOUS CODES FROM PERFORMING MALICIOUS ACTIONS IN A COMPUTER SYSTEM

BACKGROUND OF THE INVENTION

1. Field of the Invention

The present invention relates generally to computer security, and more particularly but not exclusively to methods and apparatus for combating malicious codes.

2. Description of the Background Art

Computer viruses, worms, Trojans, rootkits, and spyware are examples of malicious codes that have plagued computer systems throughout the world. Malicious codes, which are also collectively referred to simply as "viruses" or "malware," may be detected using antivirus techniques implemented in software, hardware, or a combination of hardware and software. An antivirus may employ a scan engine and malicious code patterns, which are also referred to as "virus patterns." To scan data for viruses, the scan engine compares the content of the data to the virus patterns using a pattern matching algorithm. The data is deemed infected if a match is found. In that case, various cleaning steps may be performed to prevent the virus from proliferating including quarantine, disinfection, removal, alerting the user or administrator, and so on. Virus patterns have to be continually updated to keep up with the ever increasing number and sophistication of malicious codes.

SUMMARY

Malicious codes may be prevented from performing malicious actions in a computer that does not have a virtual machine by simulating presence of the virtual machine. When a computer program performs an action in the computer, the action may be intercepted to determine if the computer program is malicious code probing the computer for presence of the virtual machine. A response to the action may be in accordance with convention of the virtual machine when the action is deemed to be for purposes of detecting the virtual machine. Otherwise, the action may be allowed to proceed.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Antivirus may be implemented in a virtual machine. Generally speaking, a virtual machine comprises software that creates a virtualized environment between a computer hardware platform and its operating system. Virtual machines may be implemented using commercially-available virtualization software, such as those from VMWare, Inc. A virtual machine provides a higher level of protection and control for antivirus operations, making it an effective environment for detecting and removing malicious codes. In response to the increasing use of virtual machines for antivirus purposes, malicious code authors try to get around virtual machine-based antivirus by detecting for the presence of a virtual machine and, if a virtual machine is detected, behaving differently to avoid detection. For example, malicious codes may terminate themselves or not perform any action in a virtual machine environment. Embodiments of the present invention take advantage of this malicious code behavior to prevent malicious codes from performing malicious actions in computers that do not have virtual machines.

Figure 1:
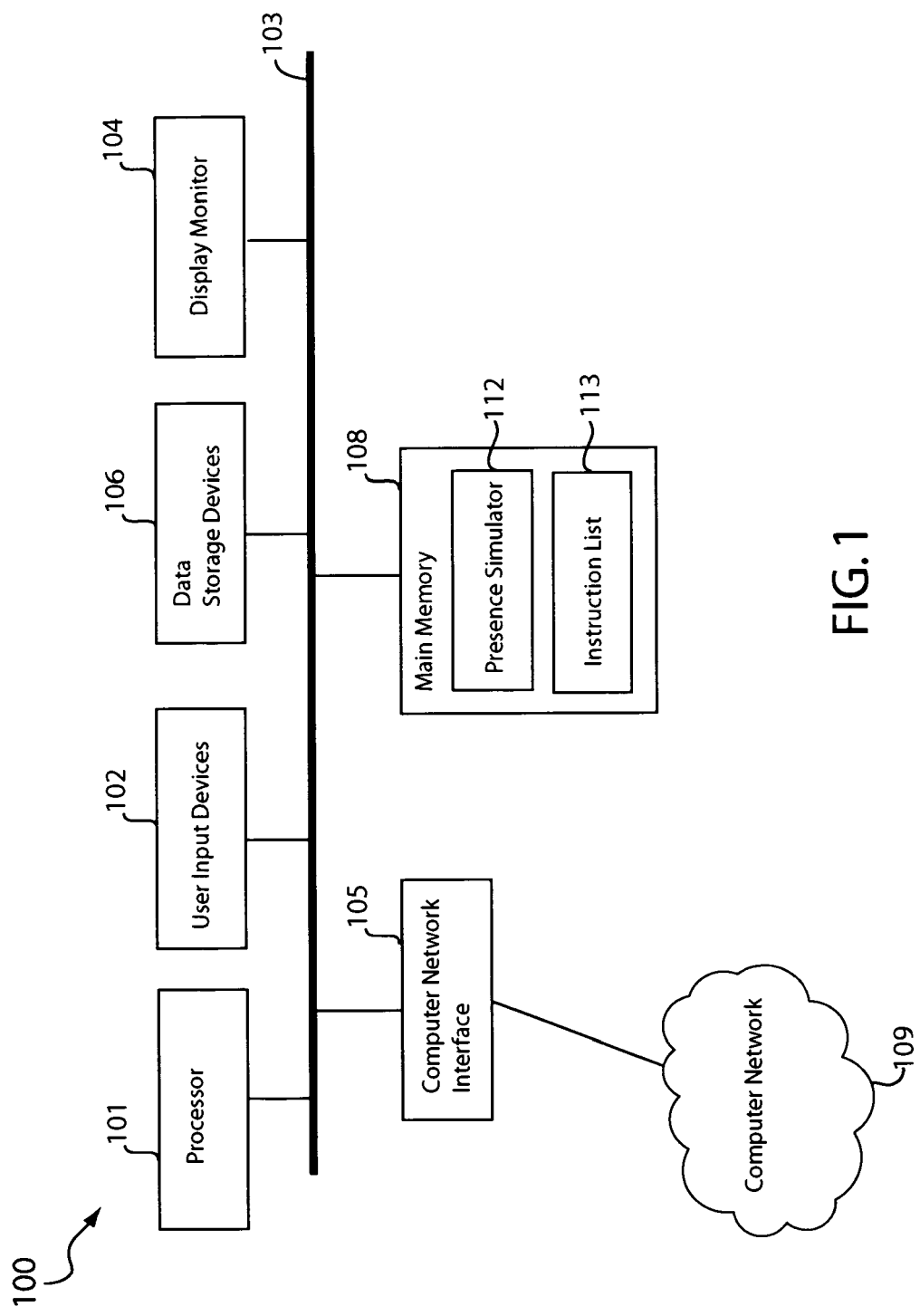
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a client computer employed by an end-user, for example. The computer 100 may have less or more components to meet the needs of a particular application. The computer 100 may include a processor 101, such as those from the Intel Corporation or Advanced Micro Devices, for example. In one embodiment, the processor 101 comprises an Intel® x86 processor. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM).

In the example of FIG. 1, the main memory 108 includes a virtual machine presence simulator 112 and an instruction list 113. The presence simulator 112 and the instruction list 113 may be loaded from the data storage device 106 to the main memory 108 for execution by the processor 101. The computer network interface 105 may be coupled to a computer network 109. The computer does not have or run a virtual machine.

The virtual machine presence simulator 112 may comprise computer-readable program code for simulating the presence of a virtual machine in computers that do not have a virtual machine. That is, the presence simulator 112 makes the computer 100 appear to be running a virtual machine even though it is not. In one embodiment, the presence simulator 112 is configured to intercept an action from a computer program running in the computer 100, determine if the action is for purposes of detecting a virtual machine, and, if so, respond to the action as if the computer program is in a virtual machine environment. Otherwise, if the action is not detecting for the presence of a virtual machine, the presence simulator 112 may allow the action to proceed.

The instruction list 113 may contain a listing of computer instructions handled differently in the computer 100 depending on whether or a virtual machine is running. Examples of such instructions include the IN and OUT instructions, which will not trigger an exception in an Intel® x86 processor in user mode running virtualization software from VMWare, Inc. Malicious codes probing the computer 100 for presence of a virtual machine may send an IN or OUT instruction to detect a virtual machine. If the IN or OUT instruction results in an exception, the malicious code assumes it is not running in a virtual machine. Otherwise, if no exception occurred, the malicious code assumes it is in a virtual machine and behaves accordingly to escape detection. For example, in that case, the malicious code may terminate itself or not perform any malicious actions. As can be appreciated, the instruction list 113 may be customized for particular types of processors.

The presence simulator 112 may be configured to intercept an instruction from a computer program in user mode and compare the instruction to those in the instruction list 113. If a match is found, the presence simulator 112 may deem that the computer program comprises malicious code detecting for the presence of a virtual machine. Detecting for presence of a virtual machine is relatively suspicious in the computer 100, which does not run a virtual machine and accordingly does not expect programs to be looking for a virtual machine. In that case, the presence simulator 112 may respond to the instruction in a manner that makes it appear a virtual machine is running in the computer 100. For example, the presence simulator 112 may simulate execution of an IN or OUT instruction in a way that does not result in an exception.

Figure 2:
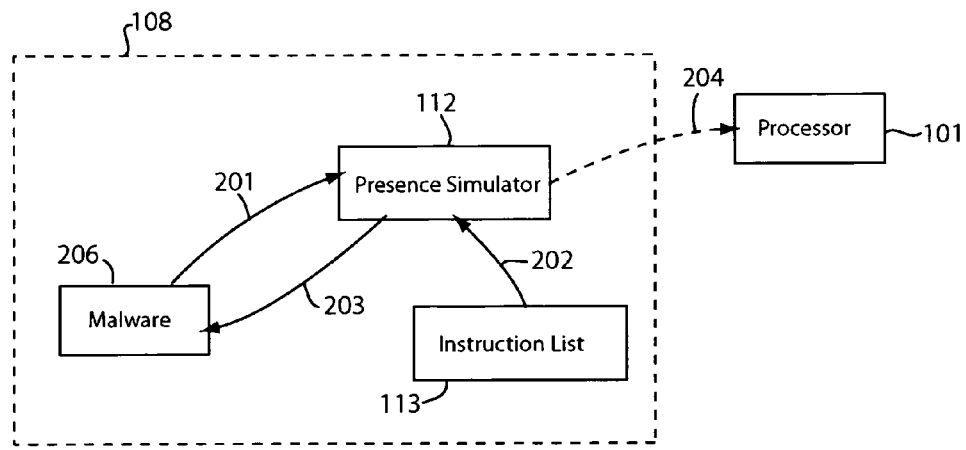
FIG. 2 shows a flow diagram schematically illustrating the operation of a virtual machine presence simulator in accordance with an embodiment of the present invention.

FIG. 2 shows a flow diagram schematically illustrating the operation of the presence simulator 112 in accordance with an embodiment of the present invention. In the example of FIG. 2, the presence simulator 112 and a malware 206 are executed by the processor 101 in the memory 108 in user (as opposed to kernel) mode. The malware 206 may comprise malicious code configured to check whether the underlying operating system environment comprises virtualization software from VMWare, Inc., for example. That is, the malware 206 is configured to determine if it is in a virtual machine prior to performing a malicious action, such as stealing confidential information, deleting files, sending unauthorized emails, etc. in the computer 100. Accordingly, in the example of FIG. 2, the malware 206 attempts to execute an instruction that is handled differently by the processor 101 depending on whether or not the malware 206 is running in a virtual machine (arrow 201).

The presence simulator 112 intercepts the instruction and compares the instruction to those in the instruction list 113 (arrow 202). If the instruction is included in the instruction list 113, the presence simulator 112 responds to the instruction in the same manner the processor 101 would if the malware 206 was in a virtual machine (arrow 203). This misleads the malware 206 into assuming that it is in a virtual machine, making the malware 206 terminate itself or not perform any malicious action to prevent detection. Advantageously, this prevents the malware 206 from causing damage in the computer 100. The malware 206 may be detected and removed in a subsequent virus scan using a commercially-available anti-virus, especially after the malware 206 is widely discovered and addressed in later developed virus patterns.

Otherwise, if the instruction is not included in the instruction list 113, the presence simulator 112 assumes that the instruction is not for detection of a virtual machine. In that case, the presence simulator 112 allows the instruction to be executed by the processor 101 (arrow 204). For example, the presence simulator 112 may simply pass the instruction to the operating system for execution by the processor 101. Arrow 204 is depicted with a dashed line in FIG. 2 to indicate that it is not going to occur in this example because of the malware 206 checking for the presence of a virtual machine.

Figure 3:
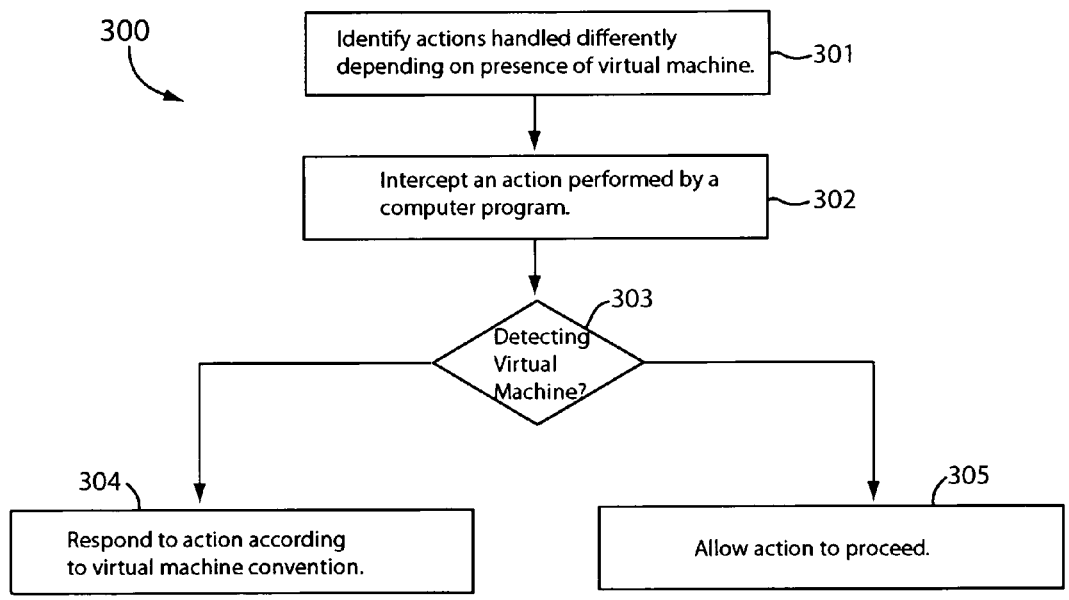
FIG. 3 shows a flow diagram of a method of preventing malicious codes from performing malicious actions in a computer system in accordance with an embodiment of the present invention.

FIG. 3 shows a flow diagram of a method 300 of preventing malicious codes from performing malicious actions in a computer system in accordance with an embodiment of the present invention. The method of 300 is explained using the components shown in FIG. 1 for illustration purposes only. Other components may also be employed without deviating from the scope and spirit of the invention.

The method 300 begins by identifying computer program actions that are handled differently depending on the presence of a virtual machine (step 301). For example, antivirus researchers my identify computer instructions that are executed differently by the processor 101 depending on whether or not the instruction is from a computer program running a virtual machine (step 301). These instructions may be maintained in an instruction list 113 for later consultation by the presence simulator 112. As can be appreciated, the computer program actions may include actions other than issuing an instruction, including issuing a function, procedure, thread, etc.

The presence simulator 112 may intercept an action performed by a computer program in the computer 100 (step 302). For example, the presence simulator 112 may intercept an instruction issued by a computer program in the computer 100 before the instruction is executed by the processor 101. This allows the presence simulator 112 to determine if the instruction is issued to check for presence of a virtual machine.

If the presence simulator 112 deems that the action is for detecting a virtual machine (step 303 to step 304), the presence simulator 112 may deem the computer program to be malicious code and respond to the action according to virtual machine convention to mislead the computer program into assuming that it is running in a virtual machine environment. For example, if the action consists of an instruction included in the instruction list 113, the presence simulator 112 may respond to the instruction in a manner expected in a virtual machine environment. Depending on the virtual machine being simulated, the response to the action may include returning particular register values, memory addresses, and other responses expected of the virtual machine in that situation.

Otherwise, if the action is not for detecting a virtual machine (step 303 to step 305), the presence simulator 112 may allow execution of the action. For example, if the action consists of an instruction that is handled by the processor 101 the same way regardless of whether or not the computer program is running in a virtual machine, the presence simulator 112 may pass the instruction for execution by the processor 101.

In light of the present disclosure, those of ordinary skill in the art will appreciate that embodiments of the present invention provide advantages heretofore unrealized. Embodiments of the present invention do not rely on virus scanning algorithms and accordingly do not consume large amounts of computing resources. These embodiments are also relatively easy to incorporate into existing antivirus products with minimal need for continuing service support. These embodiments may also be implemented as a stand-alone program depending on the application.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of preventing malicious codes from performing malicious actions in a computer, the method comprising:
    intercepting a computer instruction issued by a computer program running in a computer, wherein the computer is not running a virtual machine;
    determining if the computer instruction is a member of a set of computer instructions responded to differently in the computer depending on whether or not the virtual machine is running on the computer; and
    responding to the computer instruction in accordance with convention of the virtual machine when the computer instruction is a member of the set of computer instructions.

2. The method of claim 1 further comprising:
    allowing the computer instruction to be executed when the computer instruction is not a member of the set of computer instructions.

3. The method of claim 1 further comprising:
    maintaining in the computer a listing of computer instructions included in the set of computer instructions.

4. A computer with a memory and a processor, the memory comprising:
    a virtual machine presence simulator comprising computer-readable program code configured to simulate a presence of a virtual machine in the computer when the computer does not have the virtual machine to mislead a malicious code into assuming that it is running in the virtual machine; and
    an instruction list comprising a listing of computer instructions handled differently in the computer depending on whether or not the computer is running the virtual machine.

5. The computer of claim 4 wherein the presence simulator compares a computer instruction intercepted from a computer program to computer instructions in the instruction list.

6. The computer of claim 5 wherein the presence simulator responds to the computer instruction in a way that the virtual machine would when the computer instruction is included in the instruction list.

7. The computer of claim 5 wherein the presence simulator allows the computer instruction to be executed in the computer when the computer instruction is not included in the instruction list.

8. A computer-implemented method of preventing malicious codes from performing malicious actions in a computer, the method comprising:
    intercepting an action performed by a computer program in a computer that does not have a virtual machine;
    determining if the action is for purposes of detecting presence of the virtual machine in the computer; and
    deeming the computer program to be malicious code and responding to the malicious code in accordance with convention of the virtual machine when the action is deemed for detecting presence of the virtual machine to prevent the malicious code from performing malicious actions in the computer.

9. The method of claim 8 wherein the action performed by the computer program comprises issuing a computer instruction.

10. The method of claim 9 wherein determining if the action is for purposes of detecting presence of the virtual machine comprises:
    determining if the computer instruction is handled differently in the computer depending on whether or not the computer is running the virtual machine.

11. The method of claim 9 wherein determining if the action is for purposes of detecting presence of the virtual machine comprises:
    determining if the computer instruction is included in a listing of computer instructions that are handled differently in the computer depending on whether or not the computer is running the virtual machine.

12. The method of claim 9 further comprising:
    allowing the action to complete when the action is not deemed for detecting presence of the virtual machine.

13. A computer with a memory and a processor, the memory comprising:
    a virtual machine presence simulator comprising computer-readable program code configured to simulate a presence of a virtual machine in the computer when the computer does not have the virtual machine to mislead a malicious code into assuming that it is running in the virtual machine, wherein the virtual machine presence simulator is configured to intercept a computer instruction from a computer program and to determine if the computer instruction is for purposes of detecting for presence of the virtual machine in the computer.

14. The computer of claim 13 wherein the virtual machine presence simulator determines if the computer instruction is for purposes of detecting for presence of the virtual machine in the computer by comparing the computer instruction to those in a set of computer instructions handled differently in the computer depending on whether or not the computer is running the virtual machine.

* * * * *